J. W. BAKER.
PROPELLER BLADE FOR AEROPLANES.
APPLICATION FILED APR. 25, 1911.
1,032,729.
Patented July 16, 1912.
2 SHEETS—SHEET 1.
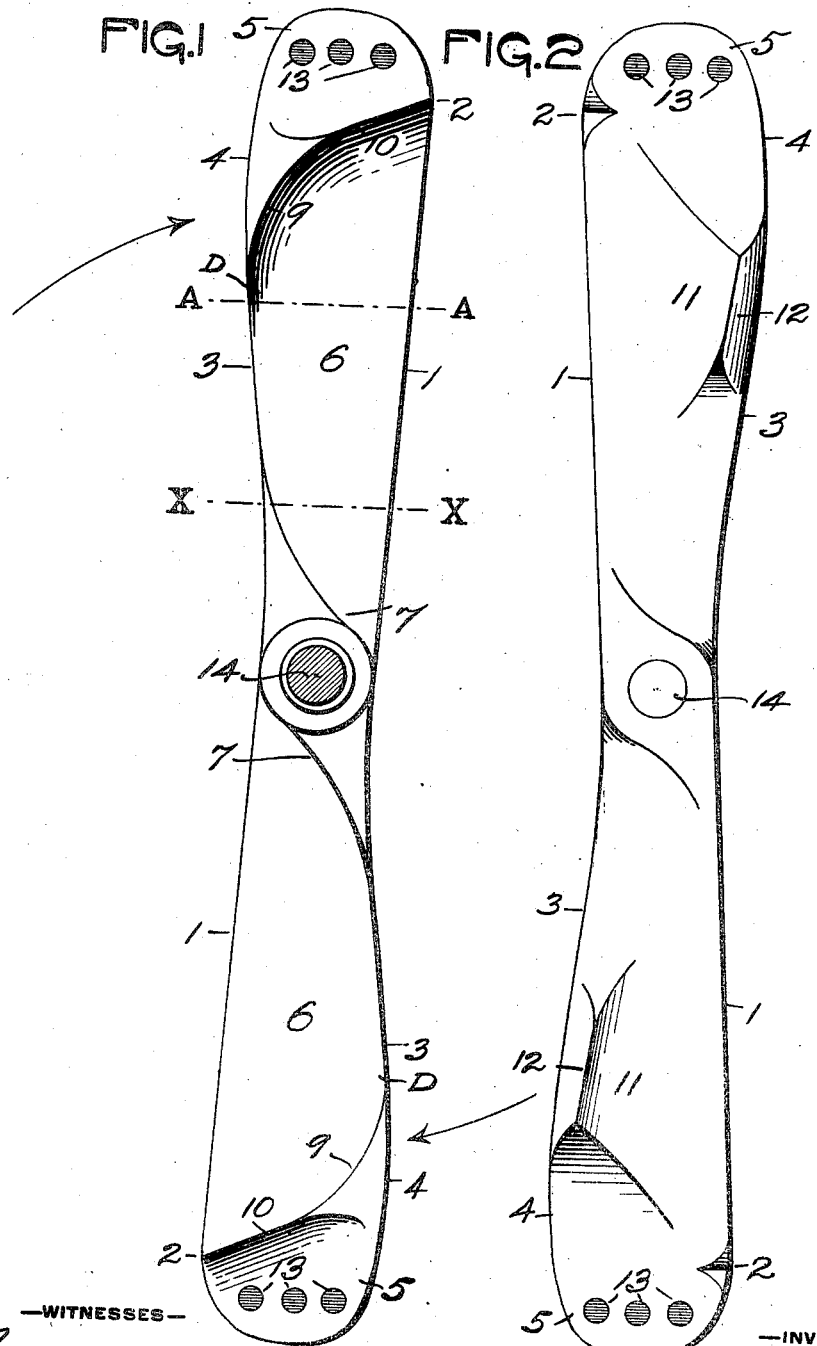

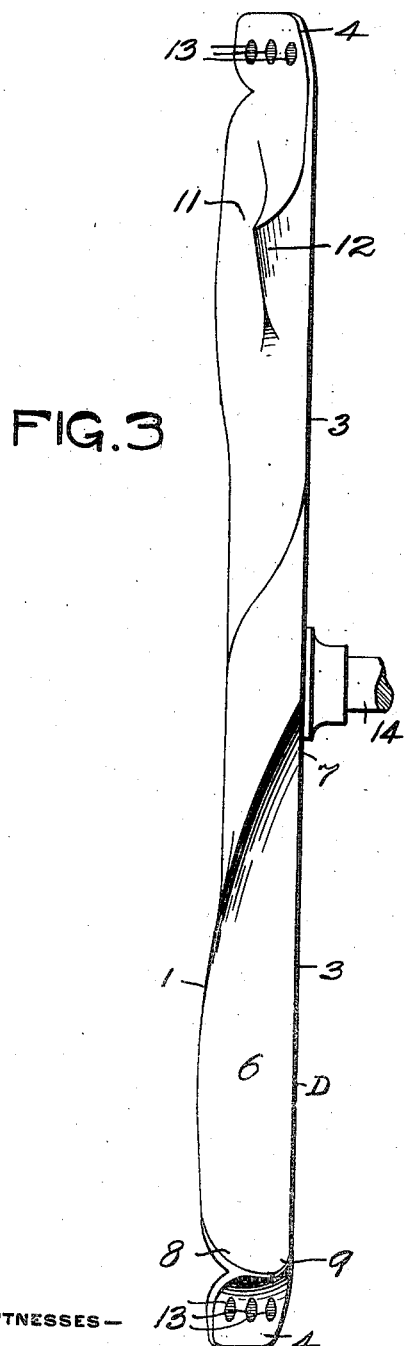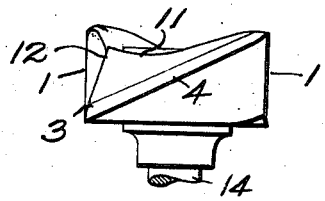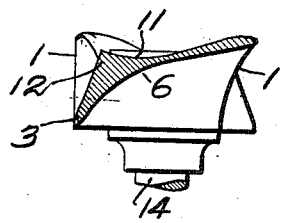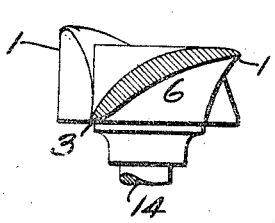

UNITED STATES PATENT OFFICE.

JESSE W. BAKER, OF PITTSBURGH, PENNSYLVANIA.

PROPELLER-BLADE FOR AEROPLANES.

1,032,729.　　　　　Specification of Letters Patent.　　Patented July 16, 1912.

Application filed April 25, 1911. Serial No. 623,165.

*To all whom it may concern:*

Be it known that I, JESSE W. BAKER, a citizen of the United States, residing at Pittsburgh, in the county of Allegheny and State of Pennsylvania, have invented certain new and useful Improvements in Propeller-Blades for Aeroplanes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in propellers for aeroplanes, and has for its object to provide a propeller with certain features of blade structure capable of being acted upon by the air pressure on its rear portion and by a vacuum on its face portion, both acting in the same direction so as to propel the craft with as little resistance and an expenditure of as little power as possible.

With the above object in view, the invention consists in the novel form of blade structure as will be hereinafter more fully described in detail and operation in the following specification, reference being had to the accompanying drawings forming a part thereof and wherein like detail parts are indicated by like reference numerals, in which drawings:

Figure 1 is a front elevation of my improved two-blade propeller. Fig. 2 is a rear elevation of the same. Fig. 3 is a side elevation thereof. Fig. 4 is an end elevation. Fig. 5 is a transverse sectional view on the line A—A of Fig. 1. Fig. 6 is a transverse sectional view on the line X—X of Fig. 1.

As shown by the drawings, each blade, in outline, (Fig. 1) on its forward edge 1, from its axis of rotation to or adjacent its extremity, at about the point 2 to its axis of rotation, is preferably straight, the opposite or rear edge 3 being preferably of a somewhat irregularly formed ogee curvature, in outline, from its axis of rotation to about the point 4, the extreme end 5 of the blade being formed as best suited, but preferably as shown.

Each blade has its rear or active face portion 6, transversely disposed at an angle to its plane of rotation, and is of an approximately concave form, both longitudinally and transversely, but varying in form and depth throughout its length, as shown at Figs. 5 and 6, the deepest portion thereof being near the extreme end of the blade, and said concave surface, in outline, from the point 7 dips downwardly toward the blade end in a somewhat irregular and comparatively flat curve along the edge 1 to an abrupt upward curvature at the point 8. The edge 3, viewed sidewise, is at right-angles to the rotative axis. The said active surface terminates in an irregular or compound curve from the said point 7 along the rear edge 3 to a comparatively abrupt curve at 9 where it ends in a straight line 10 running to the point 2. The extreme end of the blade dips beyond the straight line portion 10 and merges into the flat surface 5 of the blade end. The opposite side of the blade at its extreme end 5 is flat, and at its active, or oppositely active, surface portion is of convex form transversely, except through that portion shown in transverse section at A—A of Fig. 1, where a portion of the blade, at 11, is of concave form to and meeting the elevated rear edge portion 12. The blade, as shown at Fig. 5, transversely, has its active concave surface 6 flattened from a point about intermediate of and to its forward edge 1, the concave surface 11 on the opposite side being also flattened toward the edge 1, the intermediate portion of the blade being thinner at this point than at any other throughout its entirety.

The blades are preferably constructed of light material, such as wood, or other suitable material, and are each weighted at the ends 5 with metal, such as the lead fillings 13. In practice, the blades are mounted upon a suitably disposed drive shaft 14 of the aeroplane or craft to be driven, and when rotated, in the direction of the arrow shown at Fig. 1, the air is taken at the edge 1, acts upon and is compressed against the active concave surface 6, driving the aeroplane or craft forward, the air thus compressed flowing along the said surface from above and below to and discharging at the high point D. Again, during rotation of the blade, a vacuum is formed at the oppositely disposed concave portion 11 of the blade rear, at a point about opposite the discharge, which vacuum tends to draw the propeller in the same direction in which the aeroplane or craft is being driven, thus increasing the effect of the propeller and effecting a saving in power.

Having thus shown and described my invention, what I claim, is:

1. A propeller blade weighted at its end and having its active air-compressing surface of concave form, both longitudinally and transversely, the entire longitudinal rear edge being disposed at right angles to the axis of rotation, the transverse concavity thereof being disposed at an angle to the plane of rotation, the deepest portion of concavity and air discharging point being located at the far end of said surface, said blade having an oppositely formed concave portion disposed longitudinally thereof on the reverse side at about opposite the air discharging point.

2. A propeller blade weighted at its end and having its active air-compressing surface of irregular concave form, both longitudinally and transversely, the entire longitudinal rear edge being disposed at right angles to the axis of rotation, the transverse concavity thereof being disposed at an angle to the plane of rotation, the deepest portion of concavity and air discharging point being located at the far end of said surface, said blade having an oppositely formed concave portion disposed longitudinally thereof on the reverse side at about opposite the air discharging point, the weighted portion of the blade presenting a flat surface disposed at an angle to the plane of rotation.

In testimony whereof, I affix my signature, in presence of two witnesses.

JESSE W. BAKER.

Witnesses:
R. S. HARRISON,
D. B. OAKS.